United States Patent [19]
Yamabuchi

[11] Patent Number: 5,933,225
[45] Date of Patent: Aug. 3, 1999

[54] VEHICULAR OPTICAL RADAR APPARATUS

[75] Inventor: Hiroshi Yamabuchi, Tokyo, Japan

[73] Assignee: Mitsubishi Denki Kabushiki Kaisha, Tokyo, Japan

[21] Appl. No.: 08/976,721

[22] Filed: Nov. 24, 1997

[30]     Foreign Application Priority Data

Aug. 12, 1997 [JP] Japan .................................... 9-217708

[51] Int. Cl.⁶ ............................. G01C 3/08; B60T 7/16; G02B 26/08
[52] U.S. Cl. ...................... 356/5.01; 180/169; 356/4.01; 359/211; 359/220
[58] Field of Search ................................. 356/3.01–5.15; 180/169; 359/211, 220, 226

[56]             References Cited

U.S. PATENT DOCUMENTS

| | | |
|---|---|---|
| 2,976,362 | 3/1961 | Stamps . |
| 3,847,466 | 11/1974 | Forse . |
| 4,477,184 | 10/1984 | Endo . |
| 4,948,246 | 8/1990 | Shigematsu . |
| 5,225,882 | 7/1993 | Hosokawa et al. . |
| 5,449,898 | 9/1995 | Dosmann ................................ 359/211 |
| 5,625,447 | 4/1997 | Kikuchi .................................. 356/4.01 |

FOREIGN PATENT DOCUMENTS 5-113481   5/1993   Japan .

*Primary Examiner*—Stephen C. Buczinski
*Attorney, Agent, or Firm*—Sughrue, Mion, Zinn, Macpeak & Seas, PLLC

[57]                ABSTRACT

Vehicular optical radar apparatus adapted to enhance actual operating efficiency in causing emitted light to continuously scan in a horizontal direction with a diffusing-angle setting device (44) for setting a diffusion angle ($\alpha$) to be used for diffusing the emitted light in a vertical direction. This vehicular optical radar apparatus further comprises light receiving devices (60 to 90) that is held in such a manner as to be placed at a horizontally predetermined relative position and that is used to receive reflected light (L2) from an object, a distance computing device for computing a distance from the vehicle to the object according to a delay time between a moment, at which the emitted light is generated, and a moment at which the reflected light is received, and a direction detecting device for detecting a direction of the object according to a direction in which the emitted light is outputted when the reflected light is obtained. In this apparatus, the horizontal scanning device includes an optical system employing a prism and is operative to cause a luminous flux of the emitted light to scan continuously in a horizontal direction by transmitting and refracting the emitted light by means of the prism while rotating the prism.

19 Claims, 6 Drawing Sheets

VEHICULAR OPTICAL RADAR APPARATUS

BACKGROUND OF THE INVENTION

1. Field of the Invention

This invention generally relates to a vehicular optical radar apparatus adapted to receive light, which is reflected by and returned from an object (or body) when scanning the object in a horizontal direction with the light emitted in a direction from a vehicle, and to compute the distance from the vehicle to the object on the basis of the time difference between the emission of the light and the reception thereof and to detect the direction of the object from a scanning angle of the emitted light when the reflected light is obtained, and, more particularly, to a vehicular optical radar apparatus adapted to enhance the actual operating efficiency in performing a distance computing operation.

2. Description of the Related Art

Hitherto, there has been well known a vehicular optical radar apparatus for detecting the distance between a vehicle and an object and the direction of the object on the basis of light reflected from the object which is scanned with a luminous flux emitted from the vehicle. Such a conventional vehicular optical radar apparatus is widely used in vehicle-mounted systems such as a vehicle-surroundings monitoring system and an inter-vehicle distance control system.

Conventional vehicular optical radar apparatus of such a type is adapted in such a manner as to detect a target object in a wide range by reducing blind spots as a result of scanning the target object in a horizontal direction with emitted light by the use of a rotary mirror oscillating by a predetermined angle, as illustrated in, for example, the Japanese Unexamined Patent Publication No. 5-113481.

Generally, a device provided with a mirror and adapted to rotate the mirror within a range of a predetermined angle to thereby oscillate the mirror is used as scanning means of the conventional vehicular optical radar apparatus. Further, such conventional scanning means is adapted to simultaneously scan both of a light transmitting optical system and a light receiving optical system, because of the fact that no devices contrived in such a way as to have a wide-angle field of view have been proposed as the light receiving optical system.

However, in the case of using the scanning means adapted to oscillate the mirror, the scanning means performs a reciprocating angular motion. This results in the presence of a dead center (position) (or dead point) at which the direction of the motion is changed. Thus, the stability of the angular motion is largely degraded. Namely, the bounding (or saltation) of the scanning means at the dead center causes an impact force to thereby generate an oscillation thereof. Consequently, the angular velocity becomes unstable.

Moreover, in the case where the forward movement and the backward movement of the reciprocating angular motion are different in the angular velocity from each other, if it is assumed that the angular velocity in the forward movement is lower than the angular velocity in the backward movement during a distance measuring operation performed in such a case, a quick return (or reverse) operation is performed at a high angular velocity in the backward movement because no measurement is performed during the backward movement.

However, the presence of quick return time periods in a sequence of distance measuring operations indicates that the quick return time periods are dead (or wasteful) time during which the distance cannot be measured. Thus, in the case where the length of time of one cycle (or period) is limited, a measuring time is reduced, so that the angular velocity is increased. This directly leads to deterioration in lateral or transverse resolution of an azimuth angle. Consequently, the conventional vehicular optical radar apparatus has such a fatal defect in the radar performance thereof.

Furthermore, in the case that a distance measuring operation (or distance measurement) is performed during each of the forward and backward movements of the reciprocating motion of the scanning means, if there is caused an error in angular position between the forward and backward movements of the angular motion, even when the position of a stationary target object is detected, the detected positions thereof respectively corresponding to the forward and backward movements differ from each other. Moreover, the position of the object detected in this manner changes repeatedly every cycle of the distance measuring operation. Thus, the performance of the conventional vehicular optical radar apparatus is clearly presented. Consequently, the position of a target object cannot be detected with a high degree of precision.

Meanwhile, in the light receiving optical system of the vehicular optical radar apparatus, an angle of view (or field) for receiving light is generally determined by the focal length of the optical system and the dimensions of a light receiving element (or device). In the case of using a sensitive avalanche photodiode (hereunder abbreviated as "APD") as a light receiving element, owing to the physical characteristics of APD element, it is difficult to manufacture relatively-large-size APD elements. It is, therefore, impossible to obtain a desired angle of view.

Further, in the case of the vehicular optical radar apparatus adapted to simultaneously scan the light transmitting optical system and the light receiving optical system as above described, it is possible to detect a desired scanning range. However, the configuration of the entire apparatus is considerably complex.

For instance, to take a cam-link mechanism, in which a light transmitting mirror and a light receiving optical system are configured through a rigid link and this link is caused by a cam to perform a reciprocating angular motion, as an example, there is the need for providing not only an axle, which constitutes the fulcrum of the link, a bearing and a washer but a spring and a damper, which are used for suppression of vibrations to be caused just after reaching the dead center of the reciprocating angular motion, in the vehicular optical radar apparatus.

Moreover, in the case of using a scanning means of the omnidirectional scan type (namely, the rotary type), when a desired scanning angle is relatively small, the dead time, during which no measurement is performed, is overwhelmingly longer than the actual measuring time in one cycle (corresponding to 360°) Consequently, the actual operating efficiency is extremely degraded.

As above described, the conventional vehicular optical radar apparatus uses the scanning means of the reciprocating angular motion type, so that there is the dead center due to the reciprocating angular motion. The conventional vehicular optical radar apparatus, thus, has encountered a problem in that the stability of the angular motion is largely degraded.

Further, the conventional vehicular optical radar apparatus has encountered another problem in that if a time period, during which the backward movement of the reciprocating angular motion of the scanning means is performed, includes dead time during which the distance cannot be measured, and if the length of time of one cycle is limited, a measuring time is reduced, and as a result, deterioration in lateral or transverse resolution of an azimuth angle is caused.

Moreover, the conventional vehicular optical radar apparatus has encountered still another problem in that if the distance measuring operation is performed during each of the forward and backward movements of the reciprocating motion of the scanning means, and if there is caused an error in angular position between the forward and backward movements of the angular motion, the detected positions of a target object, which respectively correspond to the forward and backward movements come to differ from each other, and thus, the position of a target object cannot be detected with a high degree of accuracy.

Furthermore, the conventional vehicular optical radar apparatus has encountered yet another problem in that when using a sensitive APD as a light receiving element, it is difficult to manufacture relatively-large-size APD elements, and therefore, it is impossible to obtain a desired angle of view.

Additionally, the conventional vehicular optical radar apparatus has encountered a further problem in that when enabling the detection of a desired range by simultaneously scanning the light transmitting optical system and the light receiving optical system, it is necessary to use a cam-link mechanism having a large number of parts, and thus the configuration of the entire apparatus is complex.

Besides, in the case of using a scanning means of the omnidirectional scan type (namely, the rotary type), when a desired scanning angle is relatively small, the dead time, during which no measurement is performed, is overwhelmingly longer than the actual measuring time included in one cycle (corresponding to 360°). Consequently, the conventional vehicular optical radar apparatus has encountered still another problem in that the actual operating efficiency is extremely degraded.

The present invention is accomplished to solve the aforementioned problems of the conventional vehicular optical radar apparatus.

SUMMARY OF THE INVENTION

Accordingly, an object of the present invention is to provide a vehicular optical radar apparatus which enhances the actual operating efficiency (namely, the ratio of the length of a distance measuring time to that of a scanning time) by performing a horizontal scan by the use of a prism.

To achieve the foregoing object, in accordance with an aspect of the present invention, there is provided a vehicular optical radar apparatus which comprises light emitting means mounted on a vehicle, light outputting (or transmitting or sending) means which is used for deflecting light emitted from the light emitting means and for outputting the deflected light in a direction from the vehicle and has horizontal scanning means for causing light, which is emitted from the light emitting means, to scan in a horizontal direction and diffusion angle setting means for setting a diffusion (or diffusing) angle to be used for diffusing the emitted light in a vertical direction, light receiving means which is held in such a manner as to be placed at a horizontally predetermined relative position and which has reflected-light condensing means for condensing light obtained by reflecting the emitted light by an object and receives the reflected light through the reflected-light condensing means, distance computing means for computing a distance from the vehicle to the object according to a delay (or lag) time between a moment (or instant), at which the emitted light is generated, and a moment at which the reflected light is received, and direction detecting means for detecting a direction of the object according to a direction in which the emitted light is outputted (or sent out) when the reflected light is obtained. In this apparatus, the horizontal scanning means includes an optical system employing a prism and is operative to cause a luminous flux of the emitted light to scan continuously in a horizontal direction by transmitting and refracting the emitted light by means of the prism while rotating the prism.

Further, in the case of an embodiment of the vehicular optical radar apparatus of the present invention, an apex (or vertex) portion of the prism, whose apex angle determines a refractive angle thereof, of the horizontal scanning means has a continuous helical or spiral (outside) shape. Thus, the scanning is performed by continuously deflecting the outputted luminous flux of the emitted light in a horizontal direction.

Moreover, in the case of an embodiment of the vehicular optical radar apparatus of the present invention, the diffusion angle setting means includes a fan beam (shaping) optical system provided on an optical path of the emitted light through the prism and outputs the emitted light as a fan beam having a diffusion angle only in a vertical direction, which is limited in a vertical plane, after refracted by the prism.

Furthermore, in the case of an embodiment of the vehicular optical radar apparatus of the present invention, the fan beam optical system comprises a cylindrical lens, a cylindrical mirror or a cylindrical prism having a cylindrical surface, which is placed on a side thereof from which the emitted light is outputted.

Additionally, in the case of an embodiment of the vehicular optical radar apparatus of the present invention, the horizontal scanning means includes an actuator having an axis of rotation extending in a direction of an optical axis (of the optical system) corresponding to the emitted light. Further, the actuator is placed so that an axis of rotation thereof is parallel with the optical axis corresponding to the emitted light. Thereby, the horizontal scanning means causes the emitted light to reciprocatively scan within a predetermined horizontal range.

Besides, in the case of an embodiment of the vehicular optical radar apparatus of the present invention, the light receiving means is constituted by a light receiving optical system that comprises a telescopic optical system composed of at least one of a convex-and-concave-lens combination, a convex-and-concave-mirror combination and a lens-and-mirror combination, an ellipsoidal mirror placed at a nearly common position where one of focal points thereof almost coincides with one of principal points of the telescopic optical system, and a light receiving element placed at the other focal point of the ellipsoidal mirror.

Further, in the case of an embodiment of the vehicular optical radar apparatus of the present invention, an optical axis of the ellipsoidal mirror passes through the other focal point thereof and intersects an optical axis of the telescopic optical system. Thus, the ellipsoidal mirror is in an off-axis arrangement (or geometry) with respect to the optical axis of the telescopic optical system.

Moreover, in the case of an embodiment of the vehicular optical radar apparatus of the present invention, the light receiving means is constituted by a light receiving optical system that comprises a telescopic optical system composed of at least one of a convex-and-concave-lens combination, a convex-and-concave-mirror combination and a lens-and-mirror combination, a non-focusing (or non-focal-point) optical system for receiving the reflected light as parallel luminous fluxes, an ellipsoidal mirror placed at a nearly common position where one of focal points thereof almost coincides with one of principal points of the non-focusing optical system, and a light receiving element placed at the other focal point of the ellipsoidal mirror.

Furthermore, in the case of an embodiment of the vehicular optical radar apparatus of the present invention, an optical axis of the ellipsoidal mirror passes through the other focal point thereof and intersects an optical axis of the non-focusing optical system. Thus, the ellipsoidal mirror is in an off-axis arrangement with respect to the optical axis of the telescopic optical system.

Further, in accordance with another aspect of the present invention, there is provided a vehicular optical radar apparatus which comprises light emitting means mounted on a vehicle, light transmitting means which is used for deflecting light emitted from the light emitting means and for outputting (or sending out) the deflected light in a direction from the vehicle and has horizontal scanning means for causing light, which is emitted from the light emitting means, to scan in a horizontal direction and diffusion angle setting means for setting a diffusion angle to be used for diffusing the emitted light in a vertical direction, light receiving means which is held in such a manner as to be placed at a horizontally predetermined relative position and which has reflected-light condensing means for condensing light obtained by reflecting the emitted light by an object and receives the reflected light through the reflected-light condensing means, distance computing means for computing a distance from the vehicle to the object according to a delay time between a moment, at which the emitted light is generated, and a moment at which the reflected light is received, and direction detecting means for detecting a direction of the object according to a direction in which the emitted light is transmitted when the reflected light is obtained. In this apparatus, the horizontal scanning means includes a helical reflecting optical system having a helically-shaped reflecting surface and is operative to cause luminous flux of the emitted light to scan continuously in a horizontal direction by reflecting the emitted light by means of the helical reflecting optical system while rotating the helical reflecting optical system.

Further, in the case of an embodiment of this vehicular optical radar apparatus of the present invention, the helically-shaped reflecting surface of the helical reflecting optical system is configured by covering a prism, whose apex (or vertex) portion is helically-shaped, with a reflecting film.

Moreover, in the case of an embodiment of this vehicular optical radar apparatus of the present invention, the diffusion angle setting means includes a fan beam optical system provided on an optical path of the emitted light through the helical reflecting optical system and outputs the emitted light as a fan beam having a diffusion angle only in a vertical direction, which is limited in a vertical plane, after refracted by the prism.

Furthermore, in the case of an embodiment of this vehicular optical radar apparatus of the present invention, the fan beam optical system comprises a cylindrical lens, a cylindrical mirror or a cylindrical prism having a cylindrical surface, which is placed on a side thereof from which the emitted light is outputted.

Additionally, in the case of an embodiment of this vehicular optical radar apparatus of the present invention, the horizontal scanning means includes a fixed mirror for turning the light, which is emitted from the light emitting means, to the reflecting surface of the helical reflecting optical system, and an actuator having an axis of rotation extending in a direction of an optical axis (of the optical system) corresponding to the emitted light. Further, the actuator is placed so that an axis of rotation thereof is parallel with the optical axis corresponding to the emitted light. Thereby, the horizontal scanning means causes the emitted light to reciprocatively scan within a predetermined horizontal range.

Besides, in the case of an embodiment of this vehicular optical radar apparatus of the present invention, the light receiving means is constituted by a light receiving optical system that comprises a telescopic optical system composed of at least one of a convex-and-concave-lens combination, a convex-and-concave-mirror combination and a lens-and-mirror combination, an ellipsoidal mirror placed at a nearly common position where one of focal points thereof almost coincides with one of principal points of the telescopic optical system, and a light receiving element placed at the other focal point of the ellipsoidal mirror.

Further, in the case of an embodiment of this vehicular optical radar apparatus of the present invention, an optical axis of the ellipsoidal mirror passes through the other focal point thereof and intersects an optical axis of the telescopic optical system. Thus, the ellipsoidal mirror is in an off-axis arrangement with respect to the optical axis of the telescopic optical system.

Moreover, in the case of an embodiment of this vehicular optical radar apparatus of the present invention, the light receiving means is constituted by a light receiving optical system that comprises a telescopic optical system composed of at least one of a convex-and-concave-lens combination, a convex-and-concave-mirror combination and a lens-and-mirror combination, a non-focusing optical system for receiving the reflected light as parallel luminous fluxes, an ellipsoidal mirror placed at a nearly common position where one of focal points thereof almost coincides with one of principal points of the non-focusing optical system, and a light receiving element placed at the other focal point of the ellipsoidal mirror.

Furthermore, in the case of an embodiment of this vehicular optical radar apparatus of the present invention, an optical axis of the ellipsoidal mirror passes through the other focal point thereof and intersects an optical axis of the non-focusing optical system. Thus, the ellipsoidal mirror is in an off-axis arrangement with respect to the optical axis of the telescopic optical system.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

"Embodiment 1"

First, "Embodiment 1" of the present invention will be described hereinbelow with reference to the drawings.

Figure 1:
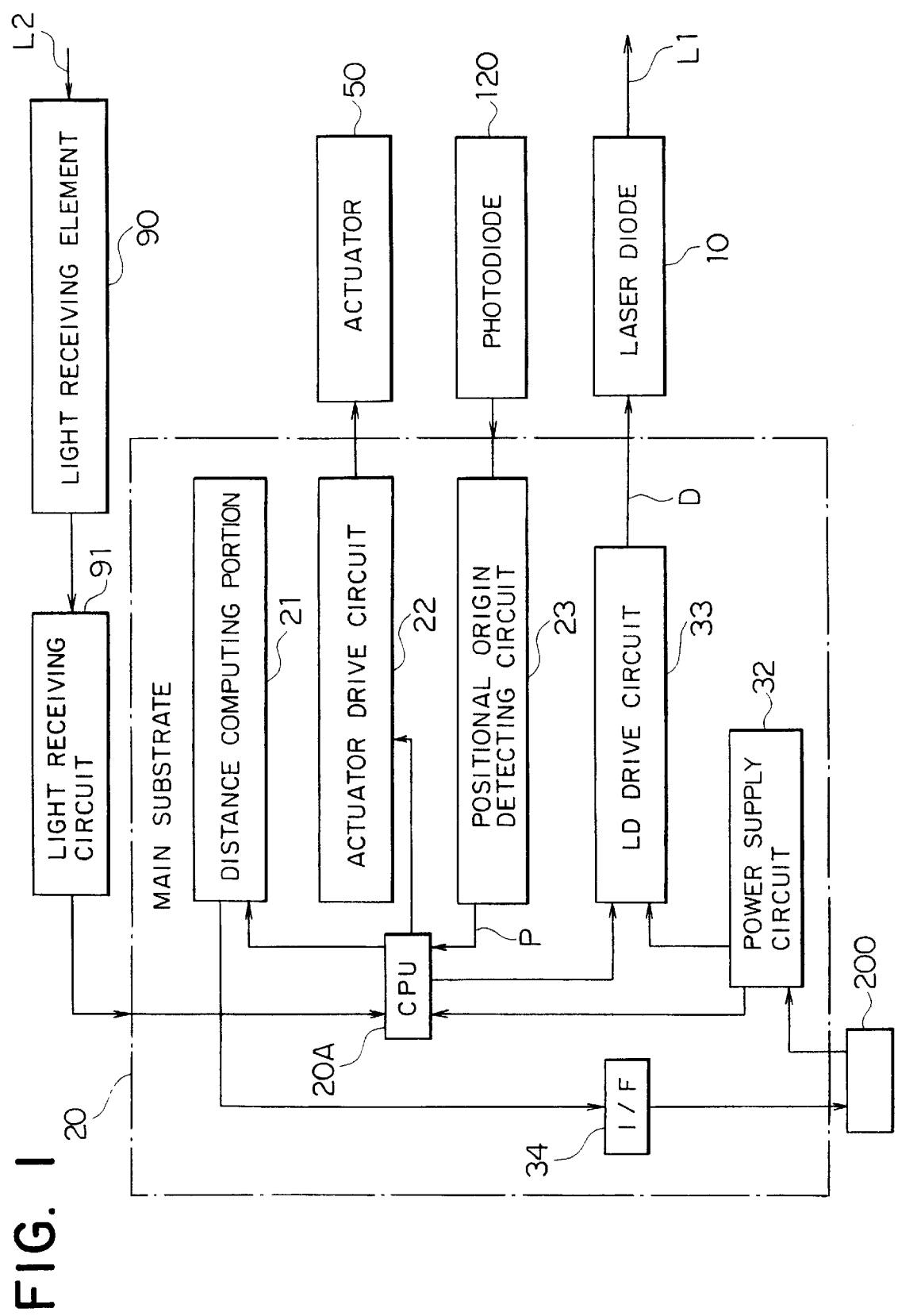
FIG. 1 is a block diagram schematically showing the configuration of "Embodiment 1" of the present invention.

FIG. 1 is a block diagram schematically showing the configuration of "Embodiment 1" of the present invention.

As shown in this figure, a light source mounted on a vehicle, namely, a laser diode (hereunder referred to simply as "LD") 10 composes light emitting means and light outputting (or sending) means, together with an optical system (to be described). Further, LD 10 generates pulse-driven laser light as output light L1 in response to a light emitting signal D consisting of a pulse train.

Vehicle-mounted main substrate (or board) 20 is loaded with various electronic components and electric parts and is provided with a central processing unit (CPU) 20A for controlling each element mounted on the main substrate 20 and with a distance computing portion 21 for computing the distance between a vehicle and a target object.

Functions of the distance computing portion 21, which works with CPU 20A and composes the distance computing means together with CPU 20A, may be included in those of CPU 20A.

Further, the main substrate 20 is equipped with an actuator drive circuit 22 for driving an actuator 50, a photodiode (hereunder referred to as "PHD") 120 for detecting an origin of one scanning period (or cycle) of the emitted light L1, a positional origin detecting circuit 23 for generating a positional origin detection signal P in response to a detection signal sent from PHD 120, a power supply circuit 32 for supplying a power-supply voltage, which is based on a battery (not shown), to each of elements provided on the main substrate 20, and LD drive circuit 33 for generating a light emitting signal D to be used to drive LD 10.

Moreover, the main substrate 20 is provided with an interface circuit (hereunder referred to as "I/F") 34 for feeding (a signal representing) a result of a computation (or operation) performed by the distance computing portion 21, and with a connector 200 for connecting the main substrate 20 to a vehicle-mounted battery and another vehicle-mounted circuit.

Furthermore, LD 10 functions as light emitting means, while a light receiving element (or device) 90 and a light receiving circuit 91 function as light receiving means. Further, the actuator 50 functions as horizontal scanning means and causes the emitted light L1 to continuously scan in a direction, in which the emitted light L1 is sent out therefrom, with a scanning cycle (or period) of T.

Additionally, PHD 120 determines a start timing of a distance measuring operation to be performed by CPU 20A in response to a positional origin detection signal P sent thereto through the positional origin detecting circuit 23.

Light receiving element 90 detects the reflected light L2 which is obtained by reflecting the emitted light L1 by an object (not shown) and returns therefrom. Then, the light receiving element 90 inputs a signal, which indicates that the reflected light L2 is detected, to the CPU 20A provided on the main substrate 20 through the light receiving circuit 91.

Distance computing portion 21 is linked with CPU 20A and functions as the distance computing means. Namely, the distance computing portion 21 computes the distance between the vehicle and the object according to a delay time $\Delta T$ between an instant, at which LD 10 generates the emitted light, and another instant at which the light receiving means receives the reflected light.

Incidentally, CPU 20A includes the direction detecting means for detecting a direction of the object on the basis of a direction of the emitted light L1 (namely, elapsed time from a moment at which the scanning is commenced) when the reflected light L2 is obtained.

Figure 2:
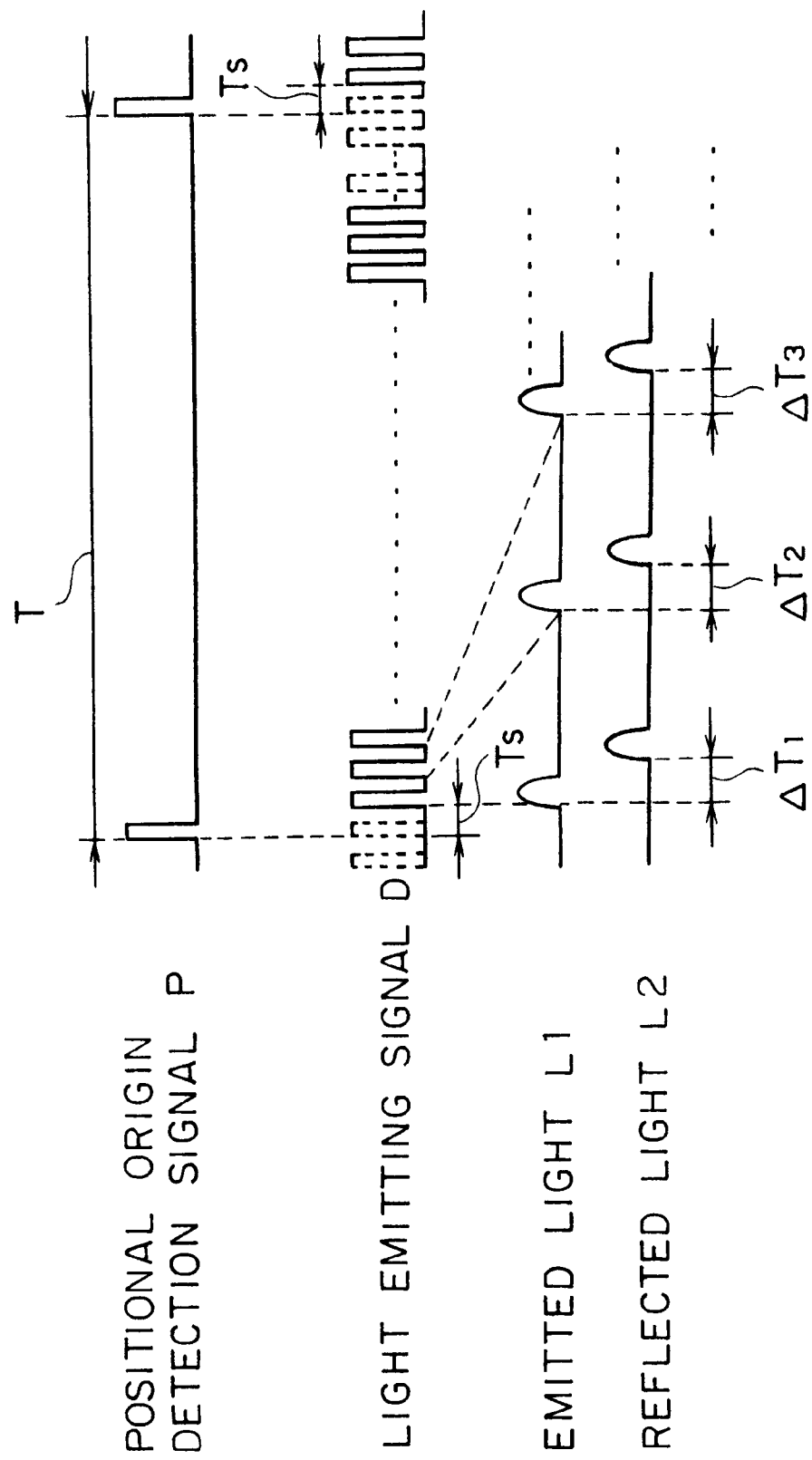
FIG. 2 is a timing chart for illustrating an operation of "Embodiment 1" of the present invention.

FIG. 2 is a timing chart of illustrating an operation of this "Embodiment 1" of the present invention.

As shown in this figure, the positional origin detection signal P is generated by the positional origin detecting circuit 23 every scanning cycle T in response to an operation of detecting the emitted light L1 (to be described later), which is performed by PHD 120.

Light emitting signal D generated from LD drive circuit 33 is composed of a train of consecutive pulses generated with a predetermined cycle (or period) and is a pulse signal. Further, a pulse signal, whose waveform is represented by solid lines, is actually used for measuring the distance between the vehicle and the object, whereas a pulse signal, whose waveform is represented by dashed (or dotted) lines, is not used for measuring the distance therebetween.

Among pulse trains of the light emitting signal D, CPU 20A recognizes pulses of a predetermined number, namely, "k" as an effective (part of the) light emitting signal D, which is effective in measuring the distance between the vehicle and the object, and uses the predetermined number of pulses for computing the distance therebetween.

Therefore, each time when a positional origin detection signal P is detected, CPU 20A uses pulses of the predetermined number "k" of the light emitting signal D in measuring the distance therebetween within one scanning cycle T.

Emitted light L1 from LD 10 is generated in such a manner as to have a waveform synchronized with each of the pulses of the light emitting signal D. Pulses of the reflected light L2 corresponding to the emitted light L1 consisting of k pulses used in measuring the distance therebetween are received by the light receiving element 90 at moments delayed from moments, at which pulses of the emitted light L1 are generated, by delay time periods $\Delta T1, \Delta T2, \Delta T3, \ldots$ and $\Delta Tk$, respectively.

Incidentally, the (pulse) cycles of the emitted light L1 and the reflected light L2 are displayed in this figure by being enlarged for convenience in readily seeing the delay time $\Delta T$ which is extremely short in comparison with a pulse period (or cycle).

Next, the principle for the distance computing operation of "Embodiment 1" will be described by referring to FIG. 2.

First, PHD 120 receives light emitted by LD 10 with certain timing, namely, every scanning cycle T. Positional origin detecting circuit 23 generates a positional origin detection signal P by performing photoelectric conversion and amplification on a detection signal outputted by PHD 120.

Then, the positional origin detection signal P is input to CPU 20A and is used as a reference signal for recognizing and determining pulses (represented by solid lines) to be used to measure the distance between the vehicle and the object, among pulses of the light emitting signal D for LD 10.

Subsequently, LD 10 responds to the light emitting signal D to thereby generate emitted light L1. Then, the light receiving element 90 receives the reflected light L2 based on the emitted light L1 and inputs a light reception signal to CPU 20A through the light receiving circuit 91.

CPU 20A and the distance computing portion 21 calculate a distance to the object Ri (i=1 to k) according to the following equation (1) on the basis of the delay time ΔTi (i=1 to k) between a moment, at which the emitted light L1 for measuring the distance between the vehicle and the target object is generated, and another moment at which the reflected light L2 from the target object is received.

$$Ri = C \cdot \Delta Ti / 2 \qquad \ldots (1)$$

where C represents the velocity of light, namely, $C = 3 \times 10^8$ [m/sec].

Further, the direction of the target object is detected by counting the delay time (corresponding to the scanning direction in which the emitted light L1 is caused to scan) between a moment, at which the positional origin reference signal P is generated, and another moment at which the reflected light L2 is received.

Figure 3:
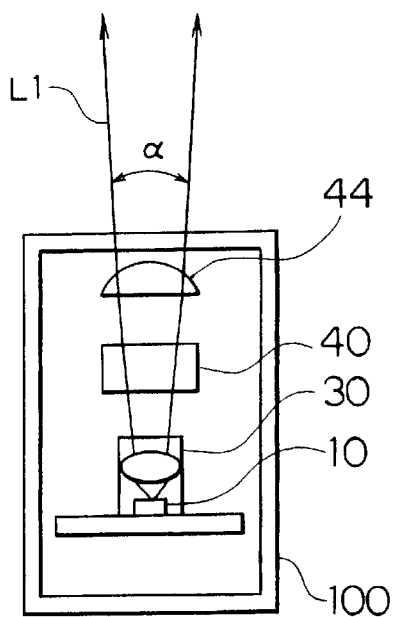
FIG. 3 is a sectional diagram showing the optical configuration of a light outputting (or sending) means illustrated in FIG. 1.
Figure 4:
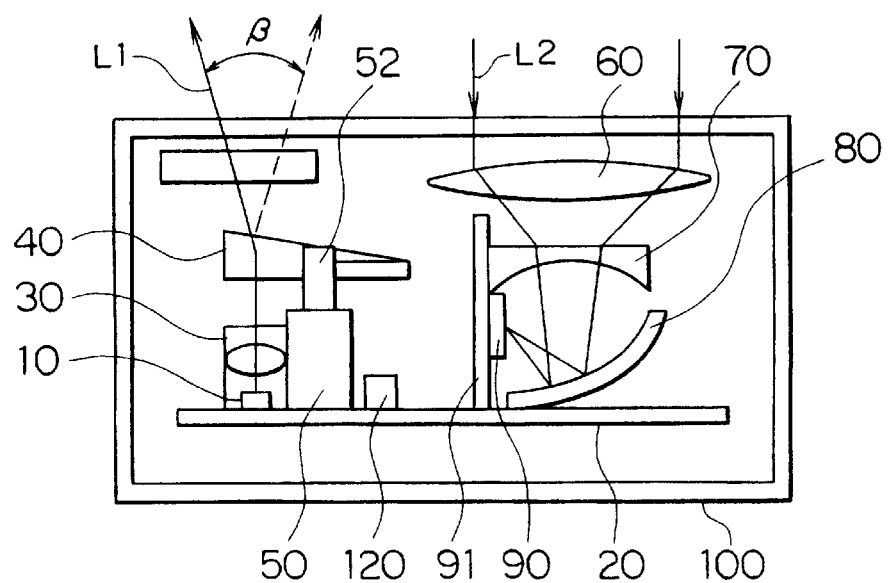
FIG. 4 is a sectional diagram showing the optical configuration of each of the light outputting means and a light receiving means illustrated in FIG. 1.

FIG. 3 is a sectional diagram showing the optical configuration of a light outputting means illustrated in FIG. 1. FIG. 4 is a sectional diagram showing the optical configuration of each of the light outputting means and a light receiving means illustrated in FIG. 1. In each of these figures, LD 10, the main substrate 20, the actuator 50, the light receiving element 90, the light receiving circuit 91, PHD 120, the emitted light L1 and the reflected light L2 are similar to the corresponding aforementioned ones of FIG. 1.

In FIGS. 3 and 4, a diffusion angle α of the emitted light L1 is shown as being formed in a vertical direction (or plane), and the scanning range β thereof is illustrated as being formed in a horizontal direction (or plane).

As shown in each of these figures, the light emitting means 30, which includes LD 10 and a collimating lens, the horizontal scanning means 40, the cylindrical lens 44, the actuator 50, a rotary shaft 52 and PHD 120 compose the light outputting (or sending) means for deflecting and sending out the emitted light L1.

Further, as shown in FIG. 4, the light receiving optical system consisting of an objective lens 60 for condensing the reflected light L2 coming from the object, a lens 70 for diverging the reflected light L2, which is transmitted by the objective lens 60, and an ellipsoidal mirror 80 placed at a position, at which one of focal points thereof nearly coincides with one of principal points of the lens 70, and the light receiving element 90 placed at the other focal point of the ellipsoidal mirror 80 compose the light receiving means, together with the light receiving circuit 91.

Objective lens 60 and the lens 70 compose a telescopic optical system provided in the light receiving means. Further, the objective lens 60, the lens 70 and the ellipsoidal mirror 80 function as the reflecting-light condensing means for converging the reflected light L2 onto a focal point on the light receiving element 90.

Light emitting means 30 including LD 10 and a collimating optical system limits the diffusion angle of the emitted light L1 and thus provides desired luminous-flux characteristics to the apparatus.

Light receiving means is mounted on the main substrate 20, together with the light outputting means. Especially, the position of the objective lens 60 provided in the light receiving means is held in such a manner as to be separated in a horizontal direction from the light emitting means 30 and to have a predetermined relative positional relation with the light emitting means 30.

Horizontal scanning means 40 provided in the light outputting means is constituted by an optical system which employs a prism. Further, the horizontal scanning means 40 causes the luminous flux of the emitted light L1 to continuously scan in a horizontal direction within a range β between a solid line and a dashed line (see FIG. 4) by transmitting and deflecting the emitted light L1 from the light emitting means 30.

Moreover, the horizontal scanning means 40 is connected directly to the rotary shaft 52 of the actuator 50 and deflects the luminous flux of the emitted light L1, which comes from the light emitting means 30, in a horizontal direction (see the range β) by working with the rotary shaft 52, which is driven by the actuator 50, and by rotating in one of clockwise and counterclockwise directions (or turning in clockwise and/or counterclockwise directions) in a vertical plane.

Furthermore, the horizontal scanning means 40 is constituted by a helical (or helically) shaped prism whose apex angle θ1 continuously changes in a section which includes the rotary shaft 52 as will be described later.

Meanwhile, a cylindrical lens 44 provided in the light outputting means composes a fan beam optical system placed on the emitted-light (L1) outputting side thereof. Further, the cylindrical lens 44 puts limitations on the diffusion angle α (see FIG. 3) in a vertical direction of luminous fluxes of the emitted light L1 deflected through the horizontal scanning means 40. Moreover, the cylindrical lens 44 establishes a desired diffusion angle a correspondingly the entire range of the scanning angle.

The collimating lens provided in the light emitting means 30 restricts the diffusion angle α of the emitted light L1. Additionally, the cylindrical lens 44 composes the diffusion angle setting means for diffusing the emitted light L1 in a vertical direction, together with the collimating lens provided in the light emitting means 30.

Thus, the luminous flux of the emitted light L1 sent from the light outputting means becomes a fan beam having a diffusion angle α (see FIG. 3) formed in a vertical direction (or plane) and is deflected in a horizontal direction by the horizontal scanning means (namely, the prism) 40 within a range of angles, which are not larger than β, and is outputted toward an object which is present in front of the vehicle.

After transmitted by the optical system provided in the light emitting means 30, the emitted light L1 from LD 10 is caused by the prism provided in the horizontal scanning means 40 to scan in a horizontal direction. Then, the emitted light L1 is transmitted by the cylindrical lens 44 and is further outputted therefrom. At that time, a part of the emitted light L1 is reflected on a plane of incidence of the cylindrical lens 44 and is then received by PHD 120.

Part of the emitted light L1, which is reflected on the plane of incidence of the cylindrical lens 44, is received by PHD 120 at a maximum level thereof, especially, when caused to scan in a horizontal direction to the side indicated by a dashed line in FIG. 4.

At that time, the positional origin detecting circuit 23 generates a positional origin reference signal P at a moment corresponding to the origin every scanning cycle T (namely, at a moment when caused to scan in a horizontal direction indicated by a dashed line) in response to a detection signal derived from the PHD 120. Then, the positional origin detecting circuit 23 inputs the generated signal P to the CPU 20A.

Pulses of the light emitting signal D, produced after lapse of a start-up time Ts from the moment of generation of the positional origin reference signal P, are regarded as being effective distance-measuring pulses. CPU 20A picks up light receiving signals indicative of receipt of pulses of the reflected light L2 produced from the emitted light corresponding to k pieces of effective distance-measuring pulses, and measures the delay time periods ΔTi (i=1 to k).

At that time, the reflected light L2 coming from the target object is transmitted by the light receiving optical system 60 to 80 (see FIG. 4) and is then condensed into the light receiving element 90 whereupon a photoelectric conversion is performed on the condensed light. Thus, the light receiving element 90 obtains a light reception signal. This reception signal is amplified by the light receiving circuit 91 and is then input to CPU 20A.

Namely, in the telescopic optical system, the objective lens 60 performs the condensing of light at an aperture side, while the lens 70 diffuses the luminous flux, which is condensed by the objective lens 60, into a relatively thin luminous flux to thereby change the magnification.

Ellipsoidal mirror 80 provided in the light receiving optical system converges the luminous flux of the reflected light L2, which is condensed by the telescopic optical system 60 and 70, onto the light receiving element 90 placed at the focal point thereof.

Light receiving element 90 performs the photoelectric conversion on the condensed luminous flux. Further, the light receiving circuit 91 amplifies the converted reception signal (representing an electric quantity).

Casing 100 forming a cover of the vehicular optical radar apparatus is made of a material having spectral characteristics, by which light beams having the wavelengths of the emitted light L1 and the reflected light L2 (for instance, near infrared rays) are transmitted.

Figure 5:
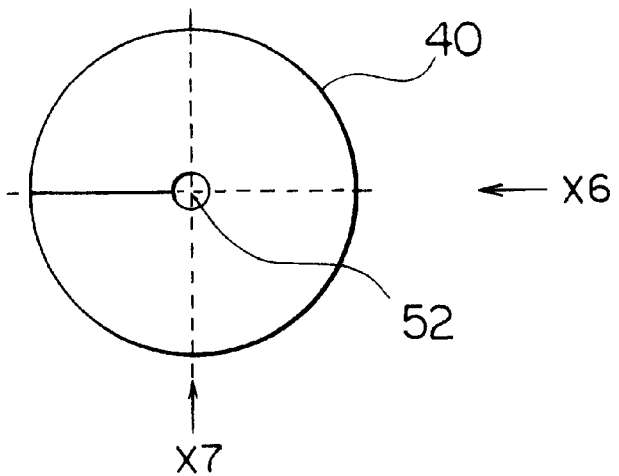
FIG. 5 is a front view of horizontal scanning means of "Embodiment 1" of the present invention, which shows the detailed configuration thereof.
Figure 6:
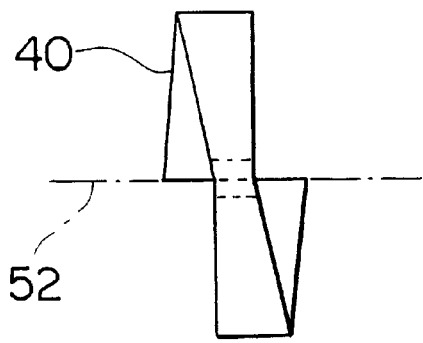
FIG. 6 is a side view of the horizontal scanning means of "Embodiment 1" of the present invention, which shows the detailed configuration thereof.
Figure 7:
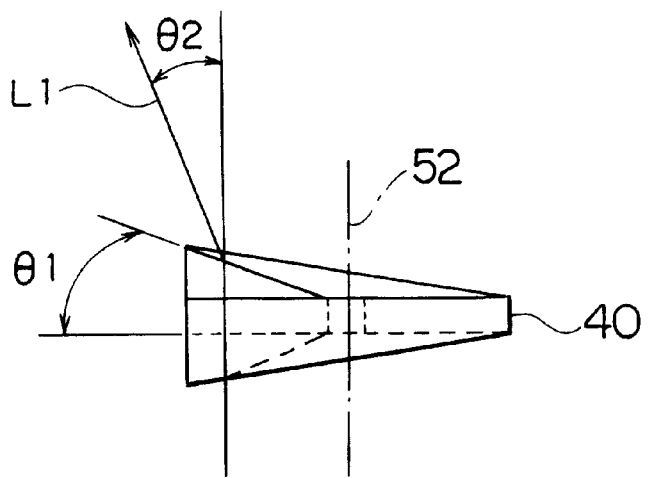
FIG. 7 is a bottom view of the horizontal scanning means of "Embodiment 1" of the present invention, which shows the detailed configuration thereof.

FIGS. 5 to 7 are diagrams illustrating the detailed configuration of the horizontal scanning means 40 constituted by the prism. FIG. 5 is a front view of the horizontal scanning means 40. FIG. 6 is a side view thereof taken in the direction of an arrow x6 shown in FIG. 5. FIG. 7 is a bottom view thereof taken in the direction of an arrow x7 shown in FIG. 5.

As shown in FIGS. 5 to 7, the apex portion of the horizontal scanning means 40, whose apex θ1 determines the refractive angle thereof, has a helical (outside) shape which continuously changes with rotation of the rotary shaft 52. Namely, the apex angle θ1 of the horizontal scanning means 40 changes continuously in a section through which the rotary shaft 52 passes.

Meanwhile, the relative position of incidence of the emitted light L1, which comes from the light emitting means 30, with respect to the horizontal scanning means 40 corresponds to a change in the apex angle θ1 thereof (namely, the prism). Thus, the refractive angle (namely, the deflection angle) θ2 is approximately half of the apex angle θ1 and changes continuously with rotation of the rotary shaft 52.

At that time, the rotary shaft 52 of the actuator 50 is placed at a location where the rotary shaft 52 and the optical axis corresponding to the emitted light L1 are in a horizontal position. Thus, a refractive angle θ2 in a horizontal direction is generated correspondingly to the emitted light L1. Consequently, the emitted light L1 can scan in a horizontal direction.

Incidentally, let "n" denote the refractive index of the horizontal scanning means (namely, the prism) 40. Refractive angle θ2 is given by the following equation (2) using the apex angle θ1:

$$\theta 2 = (n-1) \cdot \theta 1 \qquad \ldots (2)$$

With the aforementioned configuration of the horizontal scanning means 40, after the diffusion angle α of the emitted light L1 of the light emitting means 30 is limited by the collimating lens provided in the means 30, the prism of the horizontal scanning means 40 can cause the light to scan in a horizontal direction.

Thereby, the luminous flux made to be incident on the horizontal scanning means 40 is refracted by an angle θ2, which is nearly half of the apex angle θ1 of the prism, and is transmitted by the horizontal scanning means 40. Therefore, the horizontal scanning means 40 can utilize the refractive angle θ2, which is used at the time of transmitting, as the horizontally continuous scanning angle β.

Namely, the emitted light L1 can be caused to continuously scan in a horizontal direction. Thus, nearly all (almost 100%) of one scanning cycle T except a start time period Ts can be used for measuring the distance between the vehicle and the object. Consequently, the actual operating efficiency (namely, the ratio of the length of the distance measuring time to that of one scanning time period) can be extremely enhanced.

Figure 8:
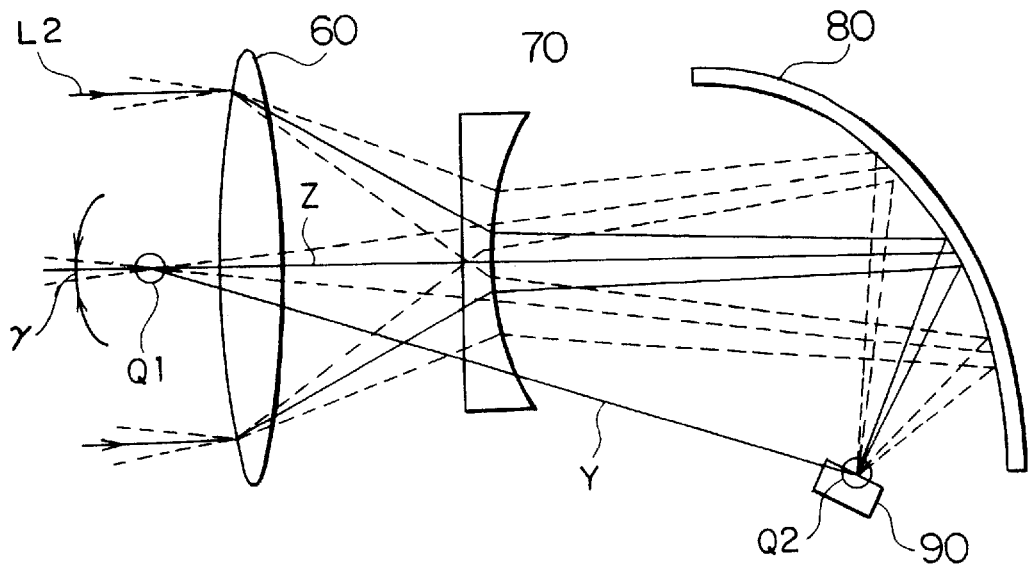
FIG. 8 is a side view of a light receiving optical system illustrated in FIG. 4.

FIG. 8 is a side view of the light receiving optical system 60 to 80 illustrated in FIG. 4. The telescopic optical system is composed of the objective lens 60 for performing a light condensing operation at the aperture side, and the lens 70 for diffusing the luminous flux converged by the objective lens. Thus, a relatively "thin" luminous flux can be generated.

Telescopic optical system 60 and 70 has characteristics by which the focal length of each of these optical system is made to be relatively long. Principal point Q1 of each of the telescopic optical system 60 and 70 is placed at a location at which the principal point Q1 nearly coincides with one of the focal points of the ellipsoidal mirror 80. Further, at a location of the other focal point Q2 of the ellipsoidal mirror 80, the light receiving element 90 is placed.

At that time, the optical axis Y of the ellipsoidal mirror 80 passes through the focal point Q1 thereof and intersects with the optical axis Z of each of the telescopic optical system 60 and 70. Ellipsoidal mirror 80 is in an off-axis arrangement with respect to the optical axis Z of the telescopic optical system 60 and 70.

With the aforementioned configuration of the light receiving optical system, even when the reflected light L2 has an angle of view γ, all of luminous fluxes of the reflected light L2 to be incident on the light receiving optical system as parallel light rays within the range of the angle of view y are converted onto the focal point Q2 on the light receiving element 90.

Further, with the off-axis arrangement of the optical axis Y of the ellipsoidal mirror 80 with respect to the optical axis Z of the telescopic optical system 60 and 70, an incident luminous flux impinging upon any point of the entire plane of incidence of the ellipsoidal mirror 80 can be converged onto the focal point Q2. Consequently, the reflected light L2 in a wide range can be detected.

Moreover, the diffusion angle α of the luminous flux of the emitted light L1 transmitted by the prism can be limited only in a vertical direction by using the cylindrical lens 44, which is used for limiting the diffusion angle in a vertical direction, at the light emitting side of the light outputting means. Fan beams each having a desired diffusion angle α, respectively, can be generated over the entire horizontal scanning range β as the emitted light L1. Thus, the diffusion angle α of the emitted light L1 can be set arbitrarily in accordance with the size of a target object to be detected.

Furthermore, in the case of this embodiment of the present invention, the horizontal scanning means 40 is rotated by the actuator 50, which has the rotary shaft 52 extending horizontally, in a direction in a vertical plane. Thus, the emitted light L1 is transmitted and refracted by the prism having the helical-shaped apex portion whose apex angle is θ1. Consequently, a horizontal deflection angle θ2 of a luminous flux, which is proportional to the apex angle θ1, can be established. Moreover, a desired scanning angle β can be set arbitrarily.

Namely, by causing the emitted light L1, which comes from the light emitting means 30, to be incident on the helical-shaped surface while rotating the prism around the rotary shaft 52, a change in apex angle θ1 of the prism, which is proportional to an angle of rotation, results in continuous change in the deflection angle θ2 after the light is transmitted by the prism. Thus, the emitted light L1 can be caused to reciprocatively scan in a horizontal direction (see the range β).

Especially, by using the helical-shaped prism, the emitted light L1 comprising continuous fan beams can be efficiently obtained. Thus, the number of parts (or components) of the apparatus can be restrained from increasing.

Furthermore, this embodiment of the present invention uses the telescopic optical system 60 and 70, whose angle of view γ does not depend on the dimensions of the light receiving element 90, and the ellipsoidal mirror 80 for converging and condensing the luminous flux coming from the telescopic optical system 60 and 70 into a single point. In addition, the principal point Q1 of the telescopic optical system nearly coincides with one of the focal points of the ellipsoidal mirror 80. Moreover, the light receiving element 90 is placed at the other focal point Q2 of the ellipsoidal mirror 80. Thus, the reflected light L2 can be detected even in the case of a wide angle of view γ.

Embodiment 2

Incidentally, in the case of the aforesaid "Embodiment 1", the telescopic optical system is configured by using a combination of the objective lens 60, which is constituted by a convex lens, and a lens 70 which is constituted by a concave lens. However, the telescopic optical system may be constituted by a combination of concave and convex mirrors or a combination of a lens and a mirror.

Figure 9:
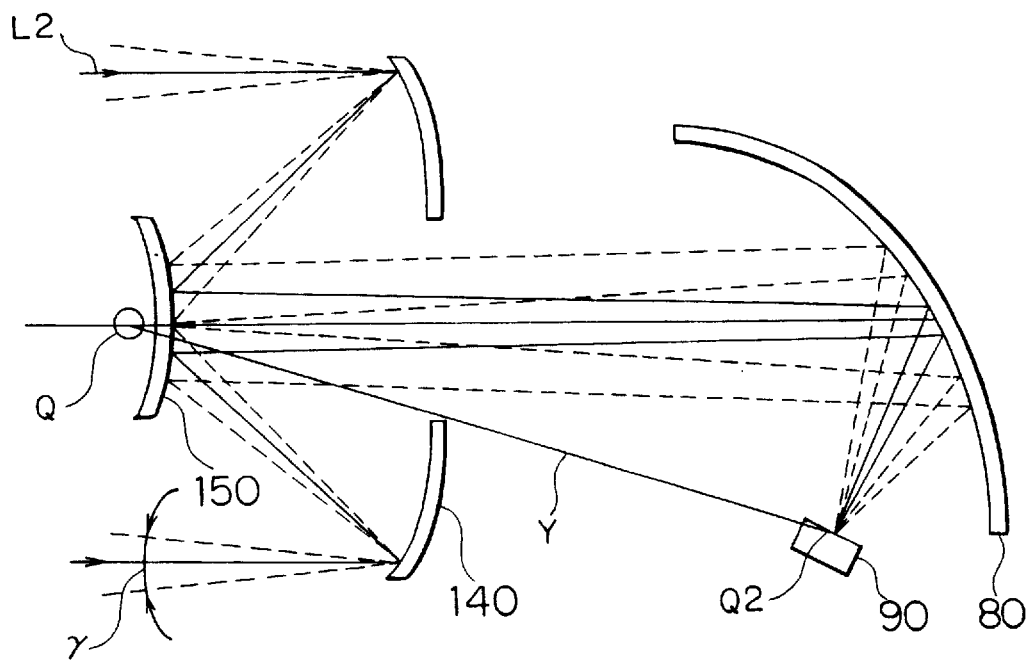
FIG. 9 is a side view of light receiving means of "Embodiment 2" of the present invention.

FIG. 9 is a side view of the light receiving means of "Embodiment 2" of the present invention, in which the telescopic optical system is composed of a plurality of mirrors.

In this figure, the reflected light L2, the principal point Q1, the angle of view γ, the ellipsoidal mirror 80, the light receiving element 90 and the optical axis Y of the ellipsoidal mirror 80 are similar to those of the aforementioned "Embodiment 1" of the present invention.

In this case, the telescopic optical system provided in the light receiving optical system is composed of a primary mirror 140 for converging the reflected light L2 at an aperture side, and a secondary mirror 150 for diffusing the reflected light L2, which is converged by the primary mirror 140. The rest of the composing elements and the arrangement thereof are similar to those of the aforementioned "Embodiment 1" of the present invention, and are, therefore, not described herein.

With the configuration of FIG. 9, the reflected light L2 in the case of the angle of view, which is within the range of the angle γ, can be converged onto the focal point Q2 of the ellipsoidal mirror 80 placed on the light receiving element 90.

Embodiment 3

Incidentally, in the case of the aforementioned "Embodiment 1" and "Embodiment 2" of the present invention, the telescopic optical system, whose focal length is relatively long, is provided in the light receiving means. However, a no-focusing optical system having no focal points may be provided therein.

In this case, the configuration of the non-focusing optical system itself is the same as illustrated in FIGS. 3 to 9, except that the reflected light L2 having passed through the non-focusing optical system becomes parallel luminous fluxes which are further made to be incident on the ellipsoidal mirror 80. Therefore, the configuration of the non-focusing optical system is not shown in the drawings.

Thus, even in the case of employing the non-focusing optical system in the light receiving means, the reflected light L2 made to be incident thereon even in the case of the angle of view, which is within the range of angles γ, can be converged onto the focal point Q2 through the ellipsoidal mirror 80. Needless to say, this "Embodiment 3" has advantageous effects similar to those of the aforementioned embodiments of the present invention.

Embodiment 4

Further, in the case of the aforesaid "Embodiment 1" and "Embodiment 2" of the present invention, the cylindrical lens 44 is used as the fan beam optical system. However, a cylindrical mirror or a prism (not shown) having a cylindrical (curved) surface may be used instead of the lens 44.

Embodiment 5

Incidentally, in the case of the aforementioned previous embodiments "Embodiment 4" to "Embodiment 4" of the present invention, the prism adapted to transmit and refract the emitted light is used as the horizontal scanning means. This, however, is not exclusive and the horizontal scanning means may be constituted by a helical reflective optical system having a helical reflective surface.

Figure 10:
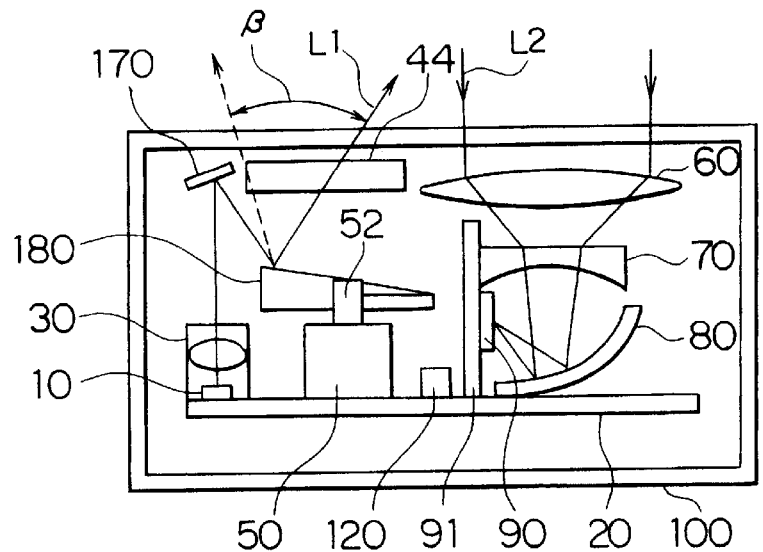
FIG. 10 is a sectional diagram showing a primary part of an optical system of "Embodiment 5" of the present invention.
Figure 11:
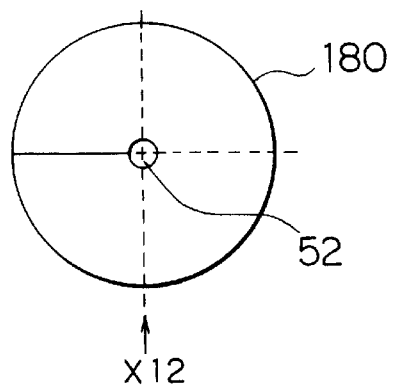
FIG. 11 is a front view of the detailed configuration of a helical reflecting mirror illustrated in FIG. 10.
Figure 12:
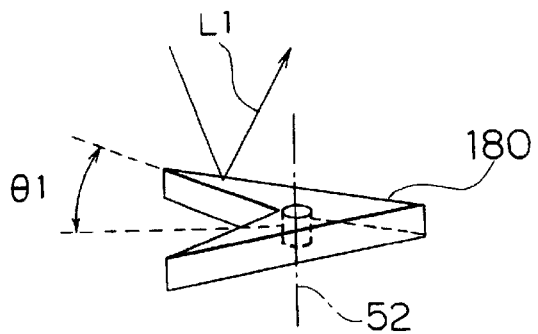
FIG. 12 is a bottom view of the detailed configuration of the helical reflecting mirror illustrated in FIG. 10.

FIG. 10 is a sectional diagram showing a primary part of an optical system of "Embodiment 5" of the present invention, which employs the helical-shaped reflecting optical system as the horizontal scanning means. FIGS. 11 and 12 are diagrams showing the concrete shape of the helical-shaped reflecting mirror (namely, the helical-shaped reflecting optical system) 180 illustrated in FIG. 10.

FIG. 11 is a front view of the helical reflecting mirror 180, and FIG. 12 is a bottom view of thereof taken in the direction of an arrow ×12 of FIG. 11.

In FIGS. 10 to 12, LD 10, the main substrate 20, the light emitting means 30, the cylindrical lens 44, the actuator 50, the rotary shaft 52, the objective lens 60, the lens 70, the ellipsoidal mirror 80, the light receiving element 90, the light receiving circuit 91, the casing 100, the emitted light L1, the reflected light L2, the apex angle θ1 and the horizontal scanning range β are similar to those of the aforementioned embodiments of the present invention. Additionally, the rest of the composing elements and the arrangement thereof are similar to those of the aforementioned embodiments of the present invention, and are, thus, not described herein.

In this case, the horizontal scanning means provided in the light outputting means includes: a fixed (or stationary) mirror for turning the emitted light L1, which comes from the light emitting means 30, to a reflecting surface of the helical-shaped reflecting mirror (namely, a helical-shaped reflecting optical system) 180; the helical-shaped reflecting mirror 180 having the reflecting surface, whose helical shape changes continuously; and the actuator 50 having the rotary shaft 52 extending in the direction of the optical axis corresponding to the emitted light L1. Further, by reflecting the emitted light L1 by the use of the helical-shaped reflecting mirror 180 while rotating the mirror 180, the luminous flux of the emitted light L1 is caused to scan in a horizontal direction continuously (see the range β).

Helical-shaped reflecting surface of the helical-shaped reflecting mirror 180 is configured by covering a prism which has a helical-shaped apex portion (and is similar to the aforementioned horizontal scanning means 40), whose apex angle is θ1, with a reflecting film. Further, the emitted light L1 coming from the light emitting means 30 is made to be incident on the helical-shaped surface through the fixed mirror 170. Thus, the helical-shaped reflecting surface can be used as a component of the helical-shaped reflecting mirror 180, in common with the horizontal scanning means 40.

Emitted light L1, which is reflected by the helical-shaped reflecting mirror 180, becomes a fan beam and is sent out through the cylindrical lens 44. Even in the case of employing the configuration of FIGS. 10 to 12, the helical-shaped reflecting mirror 180 is rotated. Thereby, a change in the apex angle θ1 leads to variations in an angle of incidence and in an angle of reflection. Thus, similarly as in the case of the aforementioned embodiments of the present invention, the emitted light L1 can be caused to reciprocatively scan in a horizontal direction (see the range β). Therefore, the emitted light L1 consisting of the fan beams, which have the predetermined diffusion angle α (see FIG. 3), can be caused to scan in a horizontal direction continuously and reciprocatively (see the range β). Consequently, this "Embodiment 5" has advantageous effects similar to those of the aforementioned embodiments of the present invention.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A vehicular optical radar apparatus comprising:
    light outputting means having:
        light emitting means mounted on a vehicle;
        horizontal scanning means for causing light, which is emitted from the light emitting means, to scan in a horizontal direction; and
        diffusion angle setting means for setting a diffusion angle to be used for diffusing the emitted light in a vertical direction;
    said light outputting means deflecting light emitted from said light emitting means and then outputting the deflected light in a direction away from said vehicle;
    light receiving means, placed at a horizontally predetermined relative position, said light receiving means having:
        reflected-light condensing means for condensing light obtained by reflection from an object, said light receiving means receiving the reflected light through said reflected-light condensing means;
    distance computing means for computing a distance from the vehicle to the object according to a delay time between a moment, at which the emitted light is generated, and a moment at which the reflected light is received; and
    direction detecting means for detecting a direction of the object according to a direction in which the emitted light was outputted when the reflected light is obtained,
    wherein the horizontal scanning means includes an optical system employing a prism and is operative to cause a luminous flux of the emitted light to scan continuously in a horizontal direction by transmitting and refracting the emitted light by means of the prism while rotating the prism, and
    wherein an apex portion of said prism, whose apex angle determines a refractive angle thereof, of said horizontal scanning means has a continuous helical shape, and wherein scanning is performed by continuously deflecting the outputted luminous flux of the emitted light in a horizontal direction.

2. The vehicular optical radar apparatus as set forth in claim 1, wherein said diffusion angle setting means includes a fan beam optical system provided on an optical path of the emitted light through said prism and outputs the emitted light as a fan beam having a diffusion angle only in a vertical direction, which is limited in a vertical plane, after being refracted by said prism.

3. The vehicular optical radar apparatus as set forth in claim 2, wherein said fan beam optical system comprises at least one of a cylindrical lens, a cylindrical mirror and a cylindrical prism having a cylindrical surface, which is placed on a side thereof from which said emitted light is outputted.

4. The vehicular optical radar apparatus as set forth in claim 1, wherein said horizontal scanning means includes an actuator having an axis of rotation extending in a direction of an optical axis corresponding to the emitted light, and wherein said actuator is placed so that an axis of rotation thereof is parallel with the optical axis corresponding to the emitted light, whereby said horizontal scanning means causes the emitted light to reciprocatively scan within a predetermined horizontal range.

5. The vehicular optical radar apparatus as set forth in claim 1, wherein said light receiving means is constituted by a light receiving optical system that comprises:
    a telescopic optical system composed of at least one of a convex-and-concave-lens combination, a convex-and-concave-mirror combination and a lens-and-mirror combination;
    an ellipsoidal mirror placed at a nearly common position where one of focal points thereof almost coincides with one of principal points of said telescopic optical system; and
    a light receiving element placed at the other focal point of said ellipsoidal mirror.

6. The vehicular optical radar apparatus as set forth in claim 5, wherein an optical axis of said ellipsoidal mirror passes through the other focal point thereof and intersects an optical axis of said telescopic optical system, and wherein said ellipsoidal mirror is in an off-axis arrangement with respect to the optical axis of said telescopic optical system.

7. The vehicular optical radar apparatus as set forth in claim 1, wherein said light receiving means is constituted by a light receiving optical system that comprises:
    a telescopic optical system composed of at least one of a convex-and-concave-lens combination, a convex-and-concave-mirror combination and a lens-and-mirror combination;
    a non-focusing optical system for receiving the reflected light as parallel luminous fluxes;
    an ellipsoidal mirror placed at a nearly common position where one of focal points thereof almost coincides with one of principal points of said non-focusing optical system, and;

a light receiving element placed at the other focal point of said ellipsoidal mirror.

8. The vehicular optical radar apparatus as set forth in claim 7, wherein an optical axis of said ellipsoidal mirror passes through the other focal point thereof and intersects an optical axis of the non-focusing optical system, and wherein said ellipsoidal mirror is in an off-axis arrangement with respect to the optical axis of said telescopic optical system.

9. A vehicular optical radar apparatus comprising:
light outputting means having:
 light emitting means mounted on a vehicle;
 horizontal scanning means for causing light, which is emitted from the light emitting means, to scan in a horizontal direction; and
 diffusion angle setting means for setting a diffusion angle to be used for diffusing the emitted light in a vertical direction;
 said light outputting means deflecting light emitted from said light emitting means and then outputting the deflected light in a direction from a vehicle;
light receiving means, placed at a horizontally predetermined relative position, said light receiving means having:
 reflected-light condensing means for condensing light obtained by reflection from an object, said light receiving means receiving the reflected light through said reflected-light condensing means;
distance computing means for computing a distance from the vehicle to the object according to a delay time between a moment, at which the emitted light is generated, and a moment at which the reflected light is received; and
direction detecting means for detecting a direction of the object according to a direction in which the emitted light was outputted when the reflected light is obtained,
wherein said horizontal scanning means includes a helical reflecting optical system having a helical-shaped reflecting surface and is operative to cause a luminous flux of the emitted light to scan continuously in a horizontal direction by reflecting the emitted light by use of said helical reflecting optical system while rotating said helical reflecting optical system.

10. The vehicular optical radar apparatus as set forth in claim 9, wherein said helical-shaped reflecting surface of the helical reflecting optical system is configured by covering a prism, whose apex portion is helical-shaped, with a reflecting film.

11. The vehicular optical radar apparatus as set forth in claim 9, wherein said diffusion angle setting means includes a fan beam optical system provided on an optical path of said emitted light through said helical reflecting optical system and outputs light reflected off of said helical-shaped reflecting surface in a fan beam having a diffusion angle only in a vertical direction which is limited in a vertical plane.

12. The vehicular optical radar apparatus as set forth in claim 11, wherein said fan beam optical system comprises at least one of a cylindrical lens, a cylindrical mirror and a cylindrical prism having a cylindrical surface, which is placed on a side thereof from which said emitted light is outputted.

13. The vehicular optical radar apparatus as set forth in claim 9, wherein said horizontal scanning means includes:
 a fixed mirror for turning the light, which is emitted from said light emitting means, to the reflecting surface of said helical reflecting optical system; and
 an actuator having an axis of rotation extending in a direction of an optical axis corresponding to the emitted light,
 wherein said actuator is placed so that an axis of rotation thereof is parallel with the optical axis corresponding to the emitted light, whereby said horizontal scanning means causes the emitted light to reciprocatively scan within a predetermined horizontal range.

14. The vehicular optical radar apparatus as set forth in claim 9, wherein said light receiving means is constituted by a light receiving optical system that comprises:
 a telescopic optical system composed of at least one of a convex-and-concave-lens combination, a convex-and-concave-mirror combination and a lens-and-mirror combination;
 an ellipsoidal mirror placed at a nearly common position where one of focal points thereof almost coincides with one of principal points of said telescopic optical system; and
 a light receiving element placed at the other focal point of said ellipsoidal mirror.

15. The vehicular optical radar apparatus as set forth in claim 14, wherein an optical axis of said ellipsoidal mirror passes through the other focal point thereof and intersects an optical axis of said telescopic optical system, and wherein said ellipsoidal mirror is in an off-axis arrangement with respect to the optical axis of said telescopic optical system.

16. The vehicular optical radar apparatus as set forth in claim 9, wherein said light receiving means is constituted by a light receiving optical system that comprises:
 a telescopic optical system composed of at least one of a convex-and-concave-lens combination, a convex-and-concave-mirror combination and a lens-and-mirror combination;
 a non-focusing optical system for receiving the reflected light as parallel luminous fluxes;
 an ellipsoidal mirror placed at a nearly common position where one of focal points thereof almost coincides with one of principal points of said non-focusing optical system; and
 a light receiving element placed at the other focal point of said ellipsoidal mirror.

17. The vehicular optical radar apparatus as set forth in claim 16, wherein an optical axis of said ellipsoidal mirror passes through the other focal point thereof and intersects an optical axis of said non-focusing optical system, and wherein said ellipsoidal mirror is in an off-axis arrangement with respect to the optical axis of said telescopic optical system.

18. An optical radar comprising:
 a light emitting device including a light emitter which continuously emits substantially coherent light pulses at a predetermined interval, wherein said light pulses pass through a helical prism;
 a light receiving device including at least one lens to focus a plurality of reflected light pulses, corresponding to said light pulses, and a light receiving element, wherein said light receiving element receives said reflected light pulses and converts said reflected light pulses into an electrical signal;
 a distance computing device and a direction detecting device, wherein each of said distance computing device and direction detecting device compares said light pulses emitted from said light emitter and said reflected light pulses to determine distance and direction to an object, respectively; and
 a scanning device which reciprocatively scans in a preferred direction and includes said helical prism, said helical prism rotating about an axis of rotation parallel to an optical path of said light pulses emitted from said light emitter, and wherein said light pulses transmitted through said helical prism are refracted in said preferred direction within a predetermined angular range.

19. An optical radar comprising:

a light emitting device including a light emitter which continuously emits substantially coherent light pulses at a predetermined interval;

a helical reflecting optical system having a helical-shaped reflecting surface which rotates about an axis, wherein said light pulses are reflected off of said helical-shaped reflecting surface;

a light receiving device including at least one lens to focus a plurality of reflected light pulses, corresponding to said light pulses, and a light receiving element, wherein said light receiving element receives said reflected light pulses and converts said reflected light pulses into an electrical signal;

a distance computing device and a direction detecting device, wherein each of said distance computing device and direction detecting device compares said light pulses emitted from said light emitter and said reflected light pulses to determine distance and direction to an object, respectively; and a scanning means which reciprocatively scans in a preferred direction and includes said helical-shaped reflecting surface, and wherein said light pulses reflected off of said helical-shaped reflecting surface are reflected in said preferred direction within a predetermined angular range.

* * * * *